(No Model.)
R. PAGE.
INDICATOR FOR POST OFFICE BOXES.
No. 282,662. Patented Aug. 7, 1883.
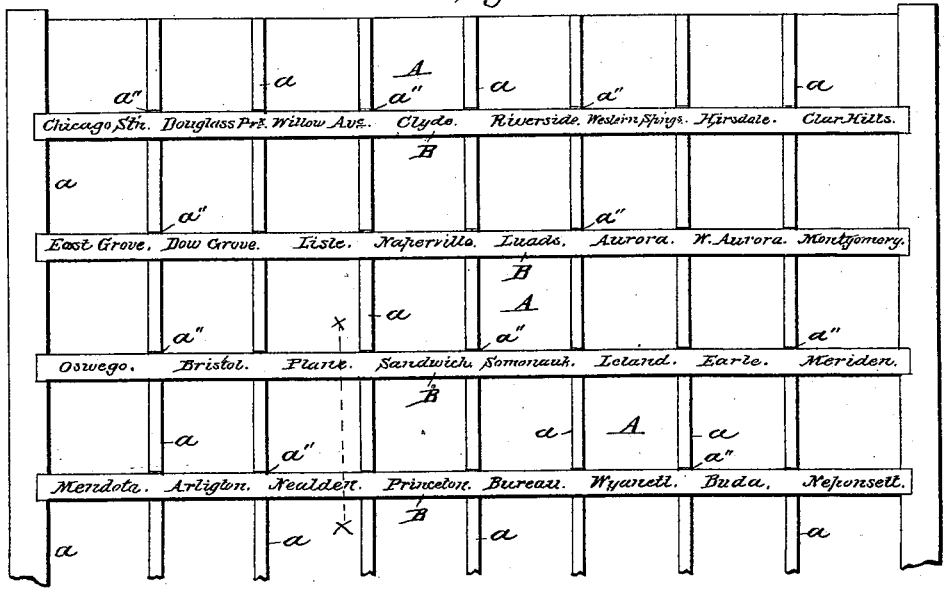
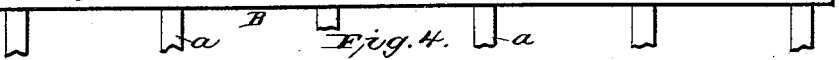
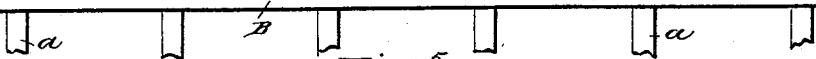
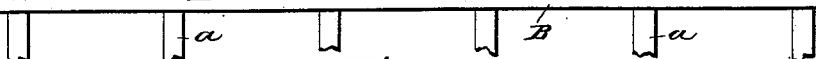
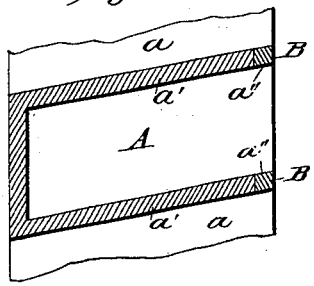
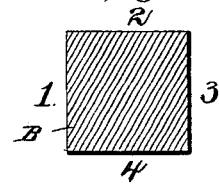

United States Patent Office.

ROWLEY PAGE, OF GALESBURG, ILLINOIS.

INDICATOR FOR POST-OFFICE BOXES.

SPECIFICATION forming part of Letters Patent No. 282,662, dated August 7, 1883.

Application filed November 6, 1882. (No model.)

*To all whom it may concern:*

Be it known that I, ROWLEY PAGE, a citizen of the United States, residing at Galesburg, in the county of Knox and State of Illinois, have invented certain new and useful Improvements in Indicators for Post-Office Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is primarily designed to be used with post-office boxes in the railway mail-service and in distributing-offices; but it may be used for other purposes.

It consists, in its essential features, in a label-carrying bar with labels secured to its several sides, which bar is removably attached in front of the division-boards which form the tops and bottoms of the boxes, so that it may be readily and easily removed and reattached with the label on either of its sides to the front.

The invention further consists in constructions and combinations hereinafter described.

In the accompanying drawings, which illustrate a series of ordinarily-arranged post-office boxes or letter-boxes and my invention, Figure 1 is a front elevation; Fig. 2, an enlarged sectional elevation through one of the boxes and the label-carrying bars in line *x x* in Fig. 1. Figs. 3, 4, 5, and 6 are enlarged side elevations, respectively, of different sides of a label-carrying bar and adjacent parts of boxes; Fig. 7, an enlarged transverse sectional elevation of a label-carrying bar.

Referring to the drawings by letters, the same letter indicating the same part in the different figures, letters A represent letter-boxes or pigeon-holes of the ordinary kind used in post-offices. As shown, the open fronts of these boxes are rectangular, and they are arranged in horizontal and in vertical series; but it is obvious that they may be modified in form without departing from the spirit of my invention.

B are bars, preferably square in their cross-section, but they may be of any desired polygonal form, or of other forms, if preferred. Each bar B has four sides, numbered, respectively, 1, 2, 3, 4, and each side of each bar has printed or otherwise formed thereon or secured thereto a series of labels, as shown at Figs. 3, 4, 5, and 6. These labels may, for post-office use, be the names of any desired post-office or other things. As a convenient means of securing the bars B in front of the boxes A, I have shown the vertical partitions *a* of the boxes projected about the thickness of a bar, B, in front of the division-board *a'*, which constitutes the tops and bottoms of the boxes, and a groove or recess, *a''*, cut in each vertical partition, in which grooves the bars B snugly fit, as shown in the drawings, so as to permit of withdrawing either bar B and again inserting it with the same side or either of its other sides forward. Each bar B extends across the horizontal series of boxes, with one of the series of labels which is to the front coinciding with each box of the series, respectively.

In the railway mail-service, where labels or names of places are fixed to the boxes in mail-cars, as is generally done, a separate box is required for each and every place or post-office and each and every railroad for which mail is made up in said car during its trip; and this necessitates, on most roads, the use of a great many boxes, only a portion of which are used at one time, or between given stations, while the balance are unused. With my improved labels a much less number of boxes may be used, as the labels may be changed by reversing the bars B, as hereinbefore described, and the same boxes then used for different places, shown on the new series of labels brought forward by reversing the bars. For instance, in starting on a trip, the bars B may be fixed over a portion of the boxes A, to bring forward the names of places and railroads for which mail is first to be made up, and when any portion of these boxes, from progress of the train past the places, become unused, the bars B may be reversed, to bring forward the labels or names of the next occurring series of places for which mail is to be made up. When the names on any number of the boxes B are all used, then other bars and boxes may be used. By having a greater number of bars B than boxes A, and all of said bars with different labels, the number of places for which each box may be used may be increased as desired.

The arrangement and order and disposition of the names on the bars B will vary on different railroads, and each railroad may arrange them to suit the order of places for which mail is made up on the trip of the mail-car or post-office on such road.

In distributing-offices this invention, it is believed, will be of great use in economizing space, expense for numerous boxes, and in enabling the operator to have the boxes nearest when required. For this use the same boxes may be used for making up mail for different places and railroads by reversing the bars to change the labels, substantially as hereinbefore described.

The bars B may be secured in front of the boxes otherwise than by seating them in the grooves, as described; and hence I do not limit my claim in this application to the specific method of fixing them; nor do I claim herein the bars adapted to be rotated, as the rotatable bars of that kind form the principal subject-matter of the claims in another application which I now have pending.

I am aware of Letters Patent No. 231,596, and do not herein make such claims as would cover the invention shown and described in said Letters Patent; but

What I claim as new is—

1. In combination with a series of post-office boxes, a bar having a series of labels or names attached thereto, located in front of the open ends of said boxes and adapted to be reversed to bring either name in the series forward, substantially as described.

2. In combination with a series of post-office boxes, a reversible label-carrying bar located in front of the open ends of said boxes, substantially as and for the purpose specified.

3. In combination with a series of post-office boxes, A, the reversible bar B, removably seated in grooves in vertical partitions that divide the boxes, and provided with labels on each of its sides adapted to be brought forward to view while the others are obscured, substantially as and for the purpose set forth.

4. In combination with a horizontal series of boxes, A, a reversible bar, B, extending across the series of boxes, and provided with labels arranged in series lengthwise of the bar, and series on its different sides, substantially as and for the purpose specified.

In testimony whereof I affix my signature in presence of two witnesses.

ROWLEY PAGE.

Witnesses:
   H. W. CARPENTER,
   GEO. SANDERSON.